(12) United States Patent
Feichtinger et al.

(10) Patent No.: US 7,135,955 B2
(45) Date of Patent: Nov. 14, 2006

(54) ELECTRICAL COMPONENT WITH A NEGATIVE TEMPERATURE COEFFICIENT

(75) Inventors: Thomas Feichtinger, Graz (AT); Christian Hesse, Deutschlandsberg (AT); Robert Krumphals, Deutschlandsberg (AT); Axel Pecina, St. Peter i. S. (AT); Volker Wischnat, Frauental (AT)

(73) Assignee: EPCOS AG, Munich (DE)

( * ) Notice: Subject to any disclaimer, the term of this patent is extended or adjusted under 35 U.S.C. 154(b) by 17 days.

(21) Appl. No.: 10/497,423

(22) PCT Filed: Dec. 2, 2002

(86) PCT No.: PCT/DE02/04409

§ 371 (c)(1),
(2), (4) Date: Aug. 19, 2004

(87) PCT Pub. No.: WO03/049126

PCT Pub. Date: Jun. 12, 2003

(65) Prior Publication Data

US 2005/0062582 A1    Mar. 24, 2005

(30) Foreign Application Priority Data

Dec. 4, 2001    (DE) ................. 101 59 451

(51) Int. Cl.
H01C 7/10 (2006.01)
H01C 7/13 (2006.01)
H01L 23/15 (2006.01)
H01L 23/053 (2006.01)

(52) U.S. Cl. .............. 338/22 R; 257/700; 257/703; 257/E21.019

(58) Field of Classification Search ........ 257/700, 257/703, E21.019; 338/204, 205, 22 R
See application file for complete search history.

(56) References Cited

U.S. PATENT DOCUMENTS

| 5,245,309 A | 9/1993 | Kawase et al. |
| 5,414,403 A | 5/1995 | Greuter et al. |
| 5,661,094 A | 8/1997 | Feltz et al. |
| 6,368,734 B1 * | 4/2002 | Mihara et al. ............ 428/699 |
| 6,525,395 B1 * | 2/2003 | Kawase et al. ............ 257/528 |
| 6,538,318 B1 * | 3/2003 | Nagareda et al. ......... 257/703 |

FOREIGN PATENT DOCUMENTS

| DE | 1465439 | 2/1969 |
| DE | 2321478 | 11/1973 |
| DE | 42 21 309 | 1/1994 |
| DE | 42 13 629 | 2/1994 |
| DE | 44 20 657 | 12/1995 |
| DE | 42 07 915 | 12/1998 |
| DE | 197 40 262 | 4/1999 |
| DE | 299 14 625 | 2/2000 |
| DE | 100 45 195 | 4/2001 |

(Continued)

Primary Examiner—Evan Pert
Assistant Examiner—Victor A. Mandala, Jr.
(74) Attorney, Agent, or Firm—Fish & Richardson P.C.

(57) ABSTRACT

An electrical component includes a base having at least a first ceramic section and a second ceramic section. The first ceramic section and the second ceramic section include different materials, which have resistances with negative temperature coefficients. The component also includes first and second contact layers on the base. The first and second ceramic sections are between the first and second contact layers. A plurality of stacks of electrically conductive electrode layers are arranged inside the base. Stacks of electrode layers are electrically connected to the first and second contact layers.

20 Claims, 4 Drawing Sheets

FOREIGN PATENT DOCUMENTS

| | | |
|---|---|---|
| DE | 199 46 196 | 4/2001 |
| JP | 04150001 | 5/1992 |
| JP | 08051004 | 2/1996 |
| JP | 09092508 | 4/1997 |
| JP | 2001-338805 * | 7/2001 ......... 7/4 |
| JP | 2001-338805 * | 12/2001 ......... 7/4 |
| JP | 2001338805 | 12/2001 |

\* cited by examiner

ELECTRICAL COMPONENT WITH A NEGATIVE TEMPERATURE COEFFICIENT

BACKGROUND

Electroceramic elements are known in which the specific resistance of the ceramic body has a negative temperature coefficient, and which therefore are usable as NTC resistors. These ceramics exhibit decreasing electrical resistance with increasing temperature. The resistance values of NTC materials show an approximately exponential dependency. The sensitivity of the change in resistance is a factor of the temperature indicating a B value. The greater this B value is, the greater the temperature sensitivity of the specific resistance of the ceramic.

Conventional NTC ceramic elements are made up of a ceramic body, onto which contact layers have been applied. Since standards are prescribed for these ceramic elements that specify the size of these elements, only one resistance value can be realized with a component of a prescribed standard having a particular resistance temperature characteristic profile (B value) and a particular capacitance. In addition, a passivation layer can be applied to these components, which protect the component against external influences, for example a change in resistance when the component is soldered.

In U.S. Pat. No. 5,245,309, ceramic NTC elements are disclosed, in which a ceramic body is produced using multi-layer technology and is made up of ceramic layers with internal electrodes arranged in them. These internal electrodes each contact an external contact layer and form an electrode terminal. Furthermore, an external passivation layer, such as glass, may be applied to the surface of the elements.

With this technology, it is possible to realize different resistances by varying the arrangement of the internal electrodes in components having the same component standard. However the electrical property, the B value, which is also important for the NTC materials, cannot be changed using this technology.

But to use the NTC elements for specific tasks, such as monitoring the temperature in mobile telephones, ceramic elements are desired which exhibit electrical properties matched to the particular problem area, in particular matched capacitance, a matched resistance/temperature characteristic profile (B value) and matched resistances at a given temperature. Since strict component standards frequently need to be maintained, there is a need for components that have different electrical properties but that have electroceramic bodies with the same dimensions and contact layers with the same dimensions. With conventional NTC elements, as described above, the B values and the resistance values cannot be varied simultaneously at will.

SUMMARY

The objective of the present invention is therefore an electroceramic NTC element for which the B values and resistance values can be varied over a wide range.

This objective is achieved, according to the present invention by an NTC element as recited in claim 1. Advantageous refinements of the element are the subject of subordinate claims.

The present invention describes a body that includes at least a first and a second three-dimensionally formed ceramic section of different materials. These materials are ceramics that exhibit a resistance with a negative temperature coefficient, i.e., that are thermistors. On the surface of the body, there are at least a first and a second contact layer.

These contact layers make it possible, for example, to solder the component into a circuit layout (SMD capability). Here, the body contains a plurality of electrically conductive electrode layers arranged with spaces between them, each of which has an electrically conductive connection with one of the contact layers, so that two stacks of electrodes are formed, each contacting one contact layer. The electrically conductive electrode layers are frequently arranged in the form of parallel electrode bundles in the ceramic body. The advantage of this element is that by varying the arrangement of the electrically conductive electrode layers, for example through the spacing of the electrode layers, the electrical resistance of the element may be adjusted especially easily. The first and second ceramic sections are positioned between the contact layers, so that the two ceramic sections, together with the electrode layers present in the body, determine the electrical properties of the element.

At the same time the important electrical properties of the NTC element, such as the B value, the resistance at a certain temperature, and the dielectric constant of the body, which determine the capacitance of the finished element, may be adjusted by appropriately combining two three-dimensionally formed NTC sections that exhibit different electrical properties and by varying the geometry of the electrode layers.

The advantage of the electrical element according to the present invention is that while maintaining the component standards, i.e., with ceramic bodies of the same dimensions, it is very easily possible to realize NTC elements with different electrical properties without a need for new NTC ceramics to be developed through time-intensive and cost-intensive research. Possibilities for ceramic materials for the first and second ceramic sections of the body thus include NTC ceramics having different dielectric constants, different electrical resistance/temperature characteristic profiles and hence different B values, and NTC materials that exhibit different electrical resistances at a given temperature. By combining these conventional NTC ceramics and varying the geometry of the electrode layers in the interior of the ceramic body, it is thus possible to realize NTC elements with electrical properties that are modified in comparison to the electrical properties of the individual ceramics.

Three-dimensionally formed ceramic sections in the meaning of this invention are sections that have a clearly determinable spatial extent, with the first and second sections, which are made of different materials, clearly distinguishable from each other.

A large number of three-dimensional design options are also possible, while keeping the external dimensions of the element according to the present invention the same. It is possible, for instance, for the second ceramic section to be positioned on the surfaces of the first section, so that, for example, first ceramic section 2 is present in the form of a rectangular solid on whose surfaces second ceramic section 5 is arranged in layer form (see also FIGS. 2A and 2B).

It is also possible for a stack of layers to be formed of three and more sections in the form of layers in any desired order, where there are, for example, two first sections present, between which a third positive-fitting section is positioned. The top and bottom layers of the stack of layers make up a second section (see also FIGS. 4A and 4B). On all surfaces of this stack of layers, which are for the most part free from the contact surfaces, there may then also be, for example, another first or second ceramic section, possibly an additional one (FIG. 4C).

As an additional embodiment, it is possible to form the first and second sections as layers. In this case, the body of the element according to the present invention is defined by a stack of these layers (see, e.g., FIGS. 3A and B). At the same time, it is possible to build up stacks of layers that consist of alternating first and second ceramic sections, or also, for example, to form stacks of a number of first ceramic layers placed one above the other, between which only one or a few layers of the other section are arranged.

The advantage of these three-dimensional design options of the element according to the present invention described above is that because of the various possibilities for designing the geometry of the active body of the element, further modification and adaptation of the electrical properties of the element becomes possible. The electrical properties of the entire element are thus determined not only by the particular proportions of the different ceramic sections used and their respective electrical properties, but also by the arrangement of these ceramic areas relative to each other in the body and their arrangement in reference to the contact layers.

It is also possible, in the case of a body that includes an alternating stack of layers of at least one first and one second ceramic section, for the contact layers to be placed on two opposing surfaces of the body.

In this case, it is then possible, in an additional embodiment of the element according to the present invention, for the contact layers to be arranged on the surfaces of the body that are formed by the faces of the sections.

Figure 6A:
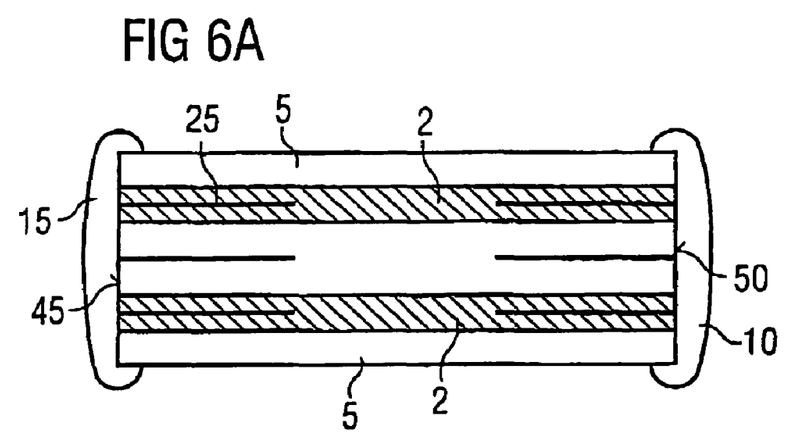
FIGS. 6A through 6C show a version of the element according to the present invention with internal electrodes.
Figure 6B:
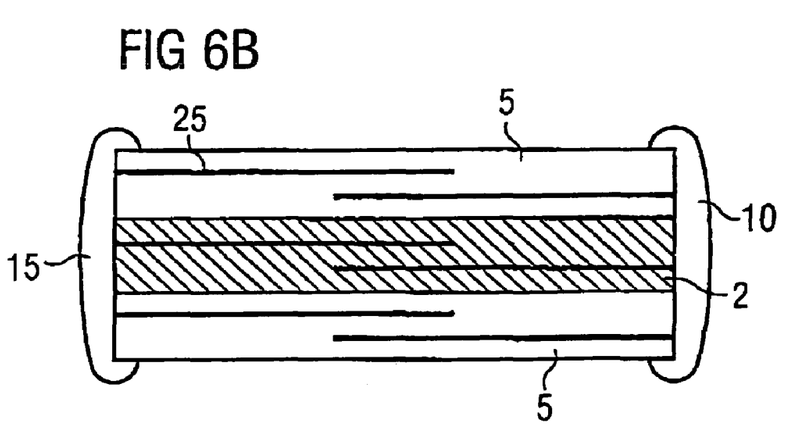
Figure 6C:
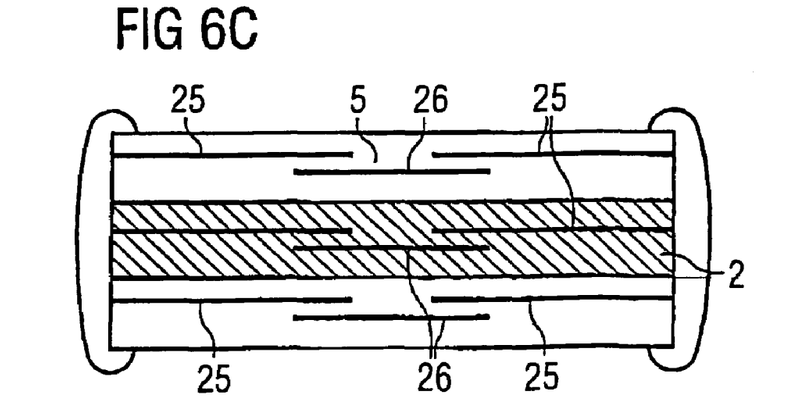

In this case, all of the faces of the ceramic layers located on one side of the stack of layers may form the surface on which a contact layer is arranged (see FIG. 6).

In another design, it is possible for a stack of layers to be formed of the first and the second ceramic section, as mentioned earlier. The contact surfaces are arranged on the top and bottom layers of the stack of layers (see FIG. 7). Thus each contact surface is then located on one main surface of a layer-shaped section.

In the case of bodies that include stacks of layers made of alternating first and second ceramic sections, the electrode layers are all arranged parallel to the alternating layers of the two sections (see FIG. 6). Here, the electrode layers may be positioned in one of the two layer sections, or in both of them, which advantageously may bring about a further change in the electrical properties of the element.

Possible ceramic materials for the first or second ceramic section include a number of nickel-manganese spinels. To reduce the specific resistance of the spinel, part of the trivalent manganese ions may be exchanged for trivalent ions $A^{III}$ that are selected from iron, titanium, aluminum or zircon, or replaced with bivalent metals $A^{II}$, which are cobalt, zinc, iron, calcium, magnesium, zircon or copper, or with a monovalent metal $A^{I}$, which is lithium. To achieve equilibrium of charges, it is therefore necessary to consider the stoichiometries, which differ depending on the valence of the metal. A doped nickel-manganese spinel, for example, conforms to the following general formula:

$$(A^{III}_{z},A^{II}_{(3/2)z},A^{I}_{3z})[Ni^{II}Mn^{III}_{2-z}]O_4,$$

where $0.01 \leq z \leq 0.6$.

It is also possible to use a nickel-manganese spinel, in which bivalent nickel is replaced with bivalent manganese, in order to increase the conductivity of the spinel. In this case, the spinel may have the following formula:

$$Ni^{II}_{1-z}[Mn^{III}_{2}Mn^{II}_{z}]O_4,$$

where $0 \leq z \leq 0.4$.

Furthermore, a manganese spinel may be used, in which bivalent manganese is replaceable with the above-named tri-, bi- or monovalent metals $A^{III}$, $A^{II}$, $A^{I}$. Such a spinel conforms to the following general formula:

$$(A^{III}_{(2/3)z},A^{II}_{z},A^{I}_{2z})[Mn^{III}_{2}Mn^{II}_{1-z}]O_4,$$

where $0.01 \leq z \leq 0.6$.

In the named spinels, the metals cobalt, zinc, iron, lithium and copper together may make up 0 to 60 weight percent of the spinel. Furthermore, other metals may also be used for doping the spinel, for example, titanium, aluminum, calcium, zircon or magnesium. As a rule, these metals make up a portion between 0 to 10 weight percent of the entire spinel.

Besides the nickel-manganese spinel, a zinc-manganese spinel $ZnMn_2O_4$ may also be used as ceramic material for a ceramic section.

It is also possible for at least one of the two ceramic materials to include a perovskite ceramic of the following general formula:

$$ABO_3,$$

in which metal A is either an element of the rare earths, strontium or barium, and metal B is magnesium, titanium, vanadium, chromium, aluminum, manganese, iron, cobalt or nickel.

The advantage of this perovskite compound is that it is stable with respect to acidic galvanic baths. Such baths may be utilized to apply the electrically conductive contact layers so that no additional precautionary measures are necessary when electrocoating, if this perovskite ceramic is the material for the ceramic section that is placed on the surface of the body.

The object of the present invention continues to be an NTC element, in which a protective layer is placed on at least two opposing surfaces of the body which are, for the most part, free of the two contact layers. The protective layer may be placed on two opposing surfaces, or on all four surfaces on which, to a great extent, no contact surfaces are present. This protective layer is preferably a material having a high specific electrical resistance of $>10^6$ $\Omega$cm. Advantageously, this protective layer prevents environmental influences that can affect the electrical properties of the NTC element. For example, it is possible to prevent a change in the electrical properties of the element during soldering on the contact surfaces. Furthermore, this protective layer can protect the element against the acidic electrocoating baths, which are normally employed to apply the contact layers. Possibilities for the protective layer include, first of all, glass, ceramics, silazanes, which are silicon-nitrogen compounds of high molecular weight, or plastics, for example parylenes. The parylenes are thermoplastic polymers with phenylene groups linked via ethylene bridges in positions 1, 4.

The element according to the present invention will now be explained in still further detail on the basis of figures and exemplary embodiments.

DETAILED DESCRIPTION

Figure 1A:
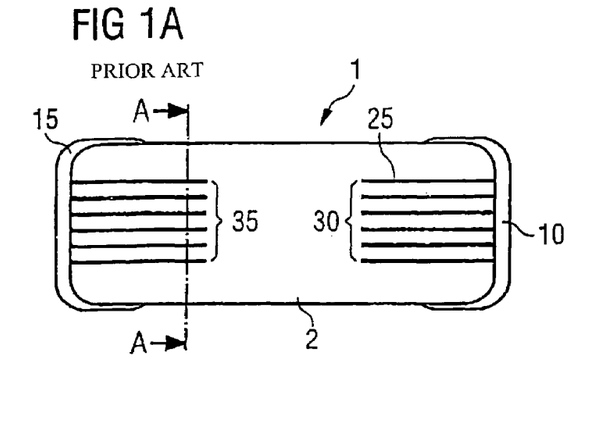
FIGS. 1A and 1B show an NTC element according to the state of the art.
Figure 1B:
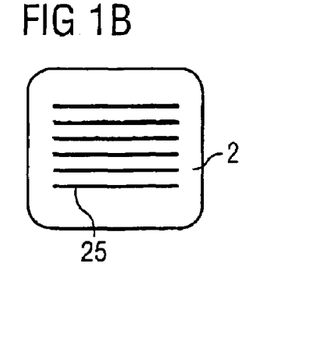

FIG. 1A shows a longitudinal sectional view of a conventional NTC element, where body 1 is made up of only a single ceramic section 2 with a ceramic material. In the interior of the element, there may be electrically conductive electrode layers 25, each electrode layer having an electrically conductive connection with a contact layer 10 or 15, so that the electrode bundles 30, 35 are formed. FIG. 1B shows the cross section through the cut designated with A in FIG. 1A. Ceramic area 2 and electrically conductive electrode layers 25 are visible.

Figure 2A:
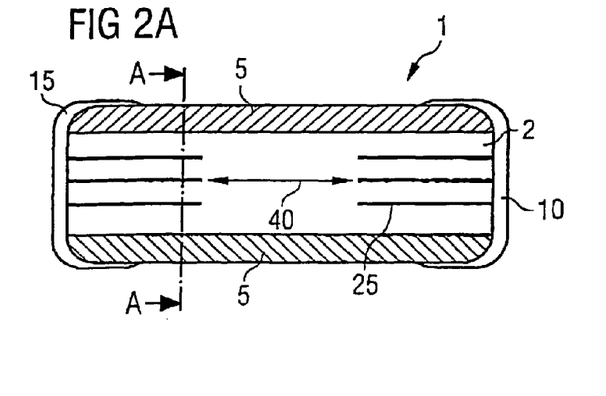
FIGS. 2A and 2B show a version of the element according to the present invention, with electrically conductive electrode layers in the interior of the body.
Figure 2B:
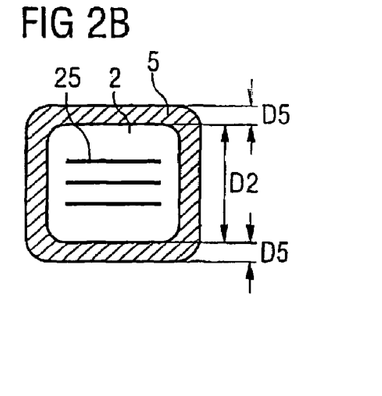

In FIG. 2A, the longitudinal sectional view through a variant of an NTC element according to the present invention is visible. In this case body 1 is made up of two ceramic sections 2 and 5. Second ceramic section 5 is placed on the surfaces of first section 2. In first ceramic area 2 there are electrode layers 25, which again form the aforementioned electrode bundles, area 40 being present between the two electrode bundles. FIG. 2B shows the stack of layers in cross section. D2 designates the thickness of the first ceramic section and D5 the thickness of the second ceramic section in a cross sectional view.

Figure 3A:
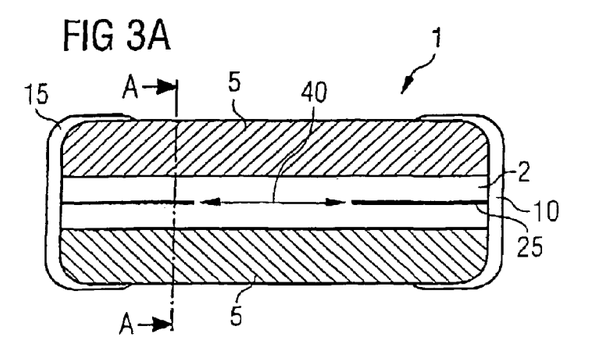
FIGS. 3A and 3B show another version of the element according to the present invention, with only one electrode layer per contact surface.
Figure 3B:
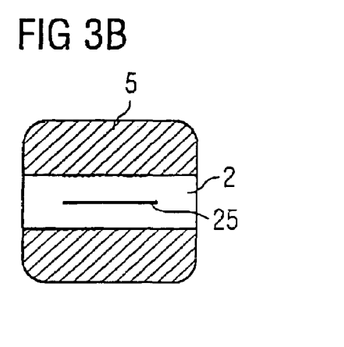

FIG. 3A shows an additional element according to the present invention in a longitudinal sectional view. Body 1 is made up, in this case, of an alternating sequence of layers of first section 2 and second section 5, the top and bottom layers being made from the second section. In first ceramic material 2 there are two electrode layers 25, each of which has an electrically conductive connection to a contact layer 10 or 15. FIG. 3B shows the cross section through the cut designated with A in FIG. 3A. The sequence of the stack of layers is clearly recognizable here.

Figure 4A:
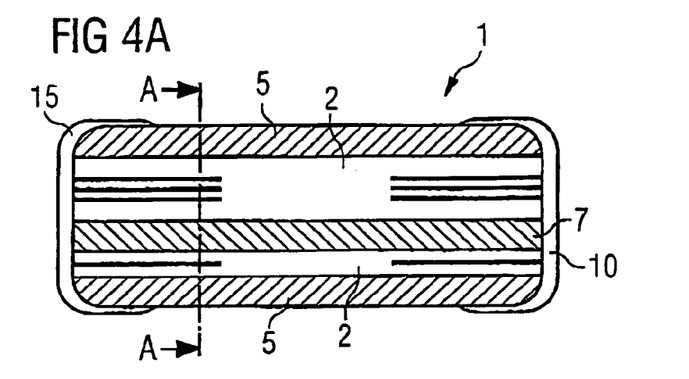
FIGS. 4A through 4C show a version with three different ceramic sections.
Figure 4B:
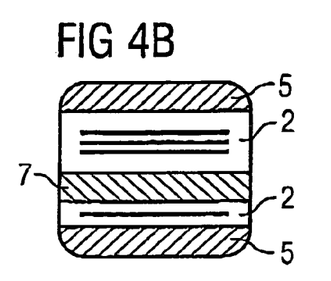
Figure 4C:
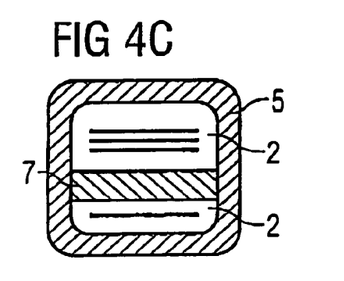

FIG. 4A shows the longitudinal section through an element according to the present invention, in which body 1 is made up of three ceramic sections 2, 5 and 7, which may be different. It can be seen that in this case, there are electrode layers only in ceramic section 2. The body may be constructed in two alternative versions, as the cross sections in FIGS. 4B and 4C show. FIG. 4B shows the cross sectional view of the body. This body is realized as a stack of layers in which there are two first ceramic sections 2, which are connected to each other by a third ceramic section 7, which is positioned between them in a positive fit. The first and second layers of this stack of layers are made of second ceramic section 5. It is also possible, when producing the element, to utilize first ceramic section 2 in this case as a compact ceramic body, onto which second and third ceramic sections 5 and 7 are then applied as layers. It is thus possible to realize this embodiment of the element according to the present invention using multi-layer technology, by stacking ceramic films or by applying ceramic films onto an already existing compact ceramic body. Alternatively, it is possible to place second ceramic section 5 on all surfaces of the stack of layers built up by first and third sections 2, 7, so that a cross section as shown in FIG. 4C results.

Figure 5A:
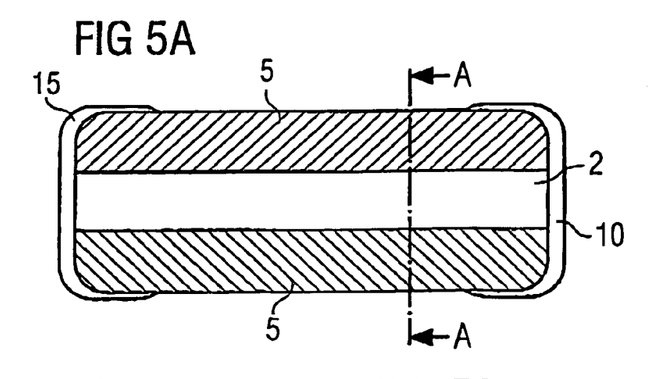
FIGS. 5A through 5C show a version of the element according to the present invention without internal electrodes.
Figure 5B:
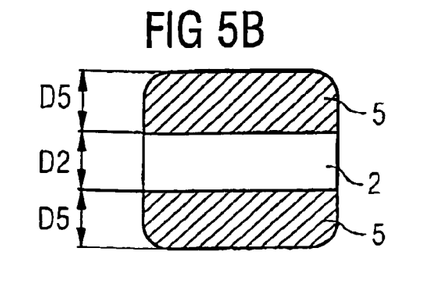

FIG. 5A shows a longitudinal sectional view through an element according to the present invention. There are no electrically conductive electrode layers 25 present in the interior, in contrast to FIG. 2A. As may be seen in the cross sections in FIGS. 5B and 5C, this element may be structured differently again in cross section. In FIG. 5B, D2 designates the thickness of the first ceramic section and D5 the thickness of the second ceramic sections.

FIG. 6A shows an element according to the present invention, whose body is made up of an alternating stack of layers from a first ceramic section 2 and a second ceramic section 5. In the second ceramic section, arranged parallel to the layers, there may be electrically conductive electrode layers 25.

In this case, the contact surfaces each contact a face of each ceramic layer section.

FIG. 6B shows an element in whose first and second ceramic sections 2, 5 there are electrode layers 25 intertwined like combs, which each contact one of the contact layers alternately. With this arrangement, it is possible to realize elements with especially low specific resistances.

FIG. 6C shows another version, in which there are electrode layers 25 in first and second ceramic sections 2, 5, the two contact layers being positioned on the opposite faces of the body. Two electrode layers are opposite each other, each of which is connected to one of the contact layers. An additional electrode layer 26, which is not in contact with any of the contact layers, is positioned parallel to these two first-named electrode layers in the body. With the help of this arrangement of electrode layers, it is possible to obtain elements with greater specific resistances but at the same time reduced capacitances.

Figure 7:
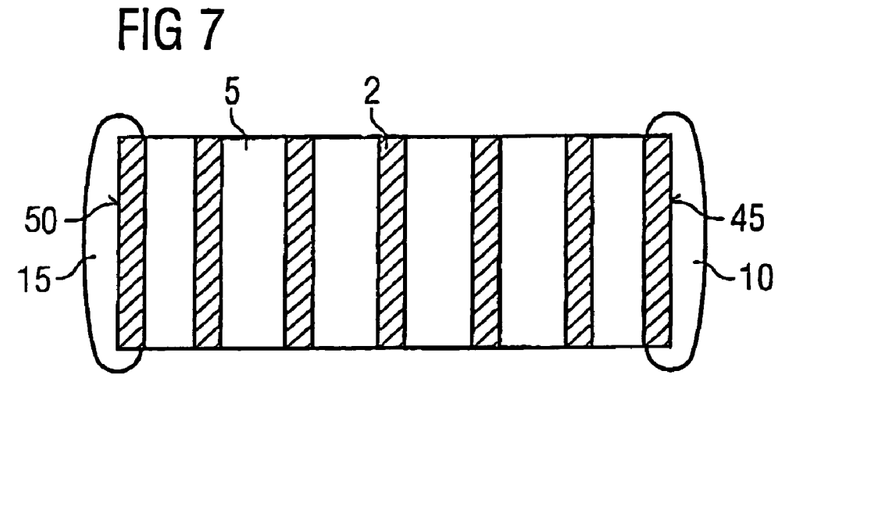
FIG. 7 shows an alternative version of the element with a body made of an alternating stack of layers.

FIG. 7 shows an alternative embodiment to FIG. 6. Here, contact surfaces 10 and 15 each contact only one main surface of a ceramic section, so that they are positioned on the first and last layers of the stack of layers. If the two ceramic sections 2 and 5 have different specific resistances at a given temperature, with the help of the alternative versions shown in FIGS. 6 and 7 it is possible to define different current paths between the two contact layers 10 and 15.

Figure 8A:
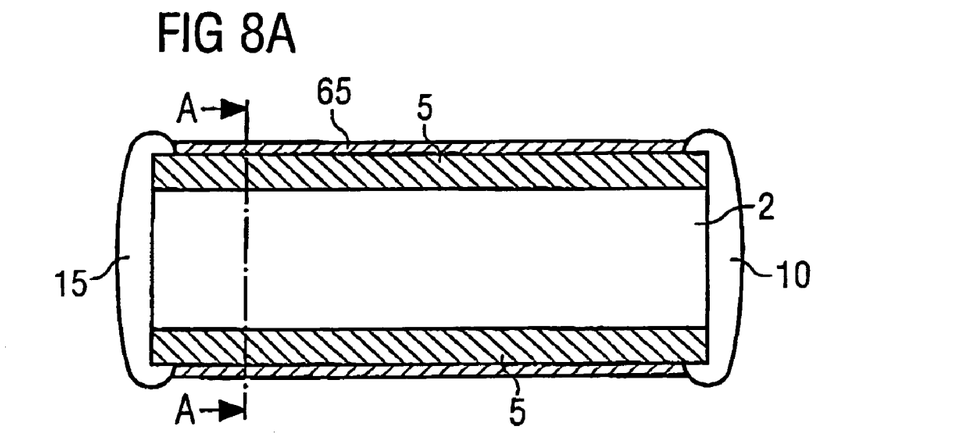
FIGS. 8A and 8B show an element according to the present invention with a protective layer.
Figure 8B:
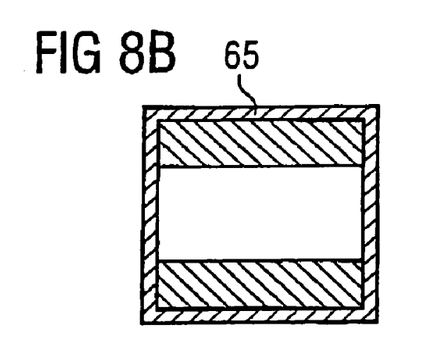

FIG. 8A shows a longitudinal sectional view through an element according to the present invention that includes a first ceramic section 2, and on top of it a second ceramic section 5. On all four surfaces of the body that are largely free of the contact surfaces, there is a protective layer 65 that protects the element from environmental influences, as may be seen in the cross section in FIG. 8B.

Exemplary Embodiment 1

An NTC element that is constructed as described in FIGS. 2A and 2B has been manufactured in accordance with the EIA standard. Depending on type, the element is about 0.9 to 4.8 mm long, about 0.4 to 6.8 mm wide, and about 0.6 to 1.7 mm high. AgPd electrodes are used for example as electrically conductive electrode layers in the interior of the body. A component has, for example, a first ceramic section 2 with a thickness of 100 µm, and second ceramic section 5 with a thickness of 390 µm located on the surfaces of this section (see FIG. 2B). Such a component has a specific nominal resistance R25 of 29,319 Ω and a B value of 3,779 K. Another element, with the same arrangement of the first and second ceramic sections, has a first ceramic section with a thickness of 800 μm and a second ceramic section on top of it with a thickness of 40 μm. This component has different electrical properties than the first-named component, namely a nominal resistance R25 of 11,270 Ω and a B value of 3,675 K. As may be seen in the cross section in FIG. 2B, the total cross section of the two ceramic sections is the same in both variants of the element. The first ceramic section of both elements consists of a nickel-manganese spinel, in which manganese may be replaced with monovalent to trivalent metals according to the general formula given earlier. A zinc-manganese spinel is used in both elements as the material for the second ceramic section.

Exemplary Embodiment 2

An NTC element is constructed according to the arrangement shown in FIGS. 5A and 5B. The body of the NTC element is made of a stack of layers that consists of first and second ceramic sections. Second ceramic section 5 constitute the top and bottom layers of the stack of layers. The second ceramic section consists of a zinc-manganese spinel, while the first ceramic section consists of the nickel-manganese spinel named earlier $$Ni^{II}_{1-z}[Mn^{III}_{2}Mn^{II}_{z}]O_4,$$

where $0.0 \leq z \leq 0.4$.

If the thickness of first ceramic section 2 is 60 μm and the thickness of the respective second ceramic section 5 is 220 μm (FIG. 5B), the result is an element with a nominal resistance R25 of 2,340,340 Ω and a B value of 4,126 K. In an element with the same body, where the thickness of the first ceramic section is 90 μm and the respective thicknesses of the second ceramic sections are 205 μm, the result is a nominal resistance R25 of 676,100 Ω and a B value of 3,992 K.

Figure 5C:
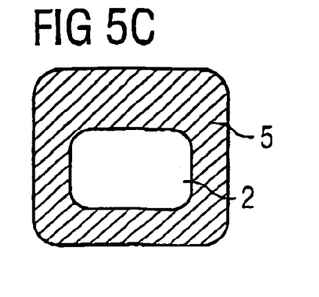

The cross sections of the two elements in FIGS. 2B and 5C show that in each exemplary embodiment, the two compared elements have the same overall dimensions of the body, despite different thicknesses of the first and second ceramic sections. The two exemplary embodiments thus show particularly well that by varying the geometry and the quantity of the two ceramic sections in the body, it is possible to produce elements with the same dimensions but different electrical properties.

The present invention is not limited to the exemplary embodiments shown here. Additional embodiments in the invention are possible, in particular, with regard to the arrangement of the ceramic sections relative to each other, as well as with regard to the ceramic thermistor material used and the number of ceramic sections used in the body.

The invention claimed is:

1. An electrical component comprising:
a base comprising at least a first ceramic section and a second ceramic section, the first ceramic section and the second ceramic section comprising of different materials, the materials having resistances with negative temperature coefficients;
a first contact layer on the base;
a second contact layer on the base, the first and second ceramic sections being between the first and second contact layers; and
a plurality of stacks of electrode layers arranged in the base, the electrode layers being electrically conductive and separated from one another, wherein stacks of electrode layers are electrically connected to the first and second contact layers.

2. The electrical component of claim 1, wherein the second ceramic section is adjacent the first ceramic section.

3. The electrical component of claim 1, wherein the first and the second ceramic sections comprise layers.

4. The electrical component of claim 1, wherein the materials have different dielectric constants.

5. The electrical component of claim 1, wherein the materials have different electrical resistance-temperature characteristic profiles.

6. The electrical component of claim 1, wherein the materials have different electrical resistances at a temperature.

7. The electrical component of claim 1, wherein the first and second contact surfaces are on opposite sides of the base;
wherein a first stack of electrode layers is connected to the first contact surface and a second stack of electrode layers is connected to the second contact surface, the first and second stacks of electrode layers being on opposite sides of the base; and
wherein the electrical component further comprises an additional electrode layer parallel to the first and second stacks of electrode layers.

8. The electrical component of claim 1, wherein part of the base is between the stacks of electrode layers.

9. The electrical component of claim 1, wherein electrode layers in different stacks of electrode layers overlaps, and adjacent overlapped electrodes in the stacks connect to different ones of the first and second contact layers.

10. The electrical component of claim 1, wherein the stacks of electrode layers are only in the first ceramic section.

11. The electrical component of claim 1, wherein the first and second contact layers are on opposing surfaces of the base;
wherein the first and second ceramic sections comprise layers; and
wherein the base comprises an alternating sequence of ceramic sections including the first and second ceramic sections, the first and second contact layers being located adjacent the first and second ceramic sections.

12. The electrical component of claim 11, wherein electrode layers in the stacks are substantially parallel to the alternating sequence of ceramic sections.

13. The electrical component of claim 1, wherein the first and second contact layers are on opposing surfaces of the base;
wherein the first and second ceramic sections comprise stacked layers, and
wherein the first and second contact layers are located on a top and a bottom, respectively, of the stacked layers.

14. The electrical component of claim 1, wherein at least one of a first material in the first ceramic section and a second material in the second ceramic section comprises a nickel-manganese spinel with one of the following general formulas:

$$(A^{III}_{z},A^{II}_{(3/2)z},A^{I}_{3z})[Ni^{II}Mn^{III}_{2-z}]O_4,$$

wherein trivalent metal $A^{III}$ comprises at least one of iron, titanium, aluminum and zircon; bivalent metal $A^{II}$ comprises at least one of cobalt, zinc, iron, calcium, magnesium, zircon and copper; and monovalent metal $A^{I}$ comprises lithium, where $0.01 \leq z \leq 0.6$; or $$Ni^{II}_{1-z}[Mn^{III}_{2}Mn^{II}_{z}]O_4,$$

where $0.0 \leq z \leq 0.4$; or $$(A^{III}_{(2/3)z},A^{II}_{z},A^{I}_{2z})[Mn^{III}_{2}Mn^{II}_{1-z}]O_4,$$

where $0.01 \leq z \leq 0.6$.

15. The electrical component of claim 14, wherein the spinel is doped with a metal that is selected from the following group: titanium, aluminum, calcium, zircon, and magnesium.

16. The electrical component of claim 1, wherein the first ceramic section comprises a nickel-manganese spinel ($NiMn_2O_4$) and the second ceramic section comprises a zinc-manganese spinel ($ZnMn_2O_4$).

17. The electrical component of claim 1, wherein at least one of the first and second ceramic sections comprises a perovskite ceramic of the following general formula:

$$ABO_3,$$

wherein metal A is an element comprising at least one of a rare earth element, strontium and barium, and metal B comprises at least one of magnesium, titanium, vanadium, chromium, aluminum, manganese, iron, cobalt and nickel.

18. The electrical component of claim 1, further comprising:
    a protective layer on at least two opposing surfaces of the base, wherein the first and second contact layers are substantially free of the protective layer.

19. The electrical component of claim 18, wherein the protective layer comprises a material with a specific electrical resistance of more than $10^6$ Ωcm.

20. The electrical component of claim 18, wherein the protective layer comprises at least one of glass, ceramics, silazanes and parylenes.

* * * * *